UNITED STATES PATENT OFFICE.

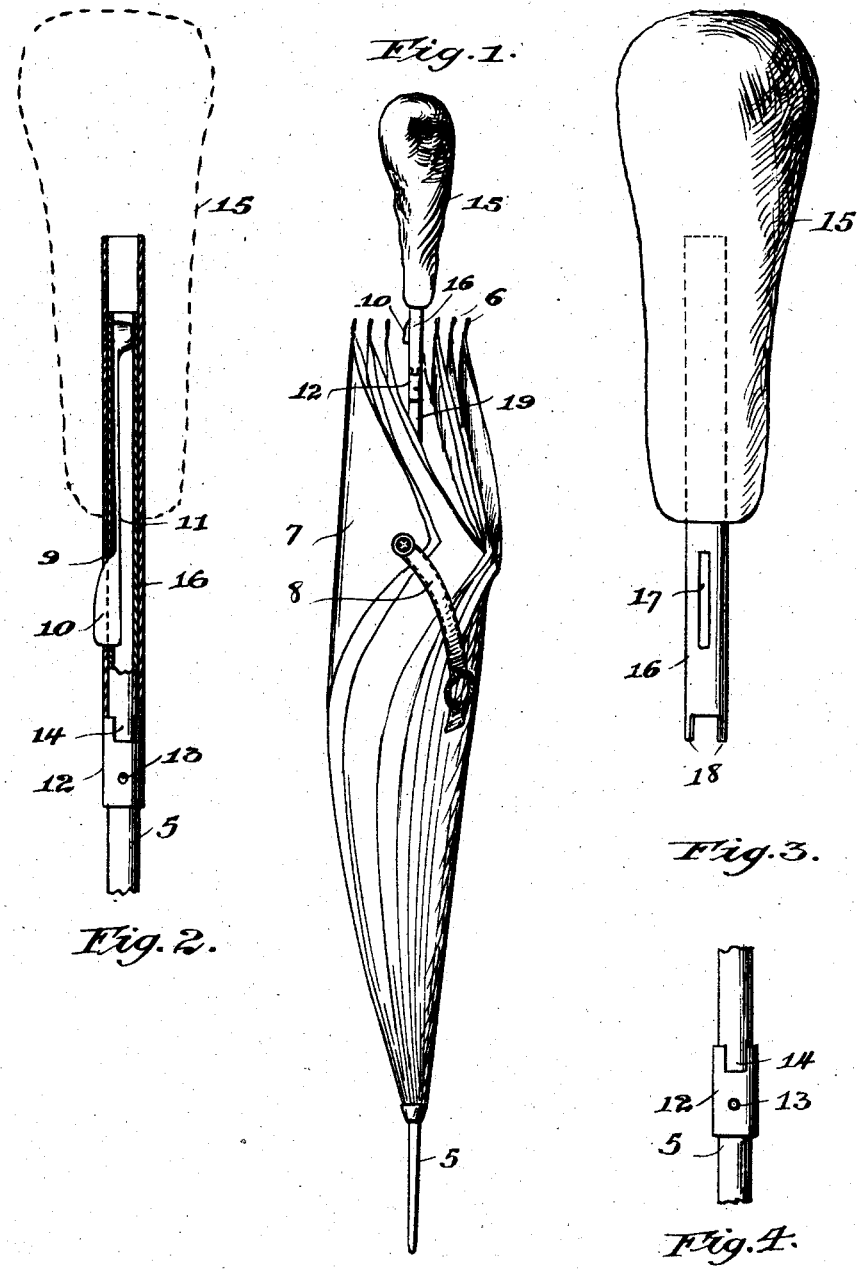

JULIUS F. WITT, OF CHICAGO, ILLINOIS.

INTERCHANGEABLE UMBRELLA-HANDLE.

No. 854,259.      Specification of Letters Patent.      Patented May 21, 1907.

Application filed January 23, 1907. Serial No. 353,718.

*To all whom it may concern:*

Be it known that I, JULIUS F. WITT, a citizen of the United States, residing at Chicago, in the county of Cook and State of Illinois, have invented certain new and useful Improvements in Interchangeable Umbrella-Handles, of which the following is a specification.

The object of the invention is to so construct the locking means for the interchangeable handle that when the umbrella is used for a cane, or the lower end thereof thrust upon the ground, the locking means will not be injured and thereby destroy the interchangeable feature of the handle.

A further object of the invention is to provide a strong and durable staff to which handles of different designs may be attached without weakening the staff, but strengthening the same at a point where the strain is generally the greatest.

The invention consists generally in the locking means upon the handle and staff whereby the interchangeable part remains stationary relative to the staff and may be easily attached and detached.

In the accompanying drawing, Figure 1 is an elevational view of my device attached to an umbrella staff; Fig. 2 is a longitudinal section of the sleeve and staff, in interlocked position; Fig. 3 is an elevation of the sleeve and handle; and Fig. 4 is an elevation of the collar on the staff, the staff being broken away.

Referring now more particularly to the drawing, 5 represents an umbrella staff to which are secured the ribs 6 carrying the cover 7 and strap 8, the parts all being of the ordinary form and construction. The staff in this particular instance consists of a hollow metal tube having a slot 9 formed therein through which a dog 10 projects, the dog having a spring shank 11, it being preferably formed integral with the dog and the shank situated within the staff with its end secured thereto in any suitable manner. The spring shank serves to normally press the dog through the slot 9 and beyond the surface thereof.

Rigidly mounted upon the staff and below the dog, as viewed in Fig. 2, is a collar or stop lock 12, it being secured to the staff by means of a rivet or any other suitable manner, and is provided with one or more longitudinal notches 14 formed at one of its ends. The collar is mounted upon the staff with the notched end upward, as viewed in Fig. 2, and forms one portion of the locking means whereby the staff is prevented from rotating relative to the handle. The handle 15 is herein shown of the ordinary form and within its body is secured a sleeve 16, it being inserted within an aperture formed in the handle and secured therein in any of the well known ways.

The sleeve extends beyond the handle for a short distance and is adapted to have a telescopic engagement with the staff 5. A slot 17 is formed longitudinally of the sleeve into which the dog 10 is sprung when the sleeve and staff have a telescopic engagement and are in their proper adjusted position. The dog projects through the slot 17 in the sleeve and thereby prevents any longitudinal sliding movement between the sleeve and the staff as well as any rotary movement of the two members relative to each other.

The lower end of the sleeve 16 is provided with one or more longitudinally projecting tongues 18 which register with the notch or notches 14 in the collar 12 and are adapted to be seated therein when the parts are telescoped and in their proper position. This construction not only prevents the staff from having a rotary movement relative to the sleeve, but also affords a construction wherein the interchangeable part does not become jammed or injured as there is no wedging action between the sleeve and staff. In the preferred form the collar 12 is secured to the staff at a point just above the runner 19 when the umbrella is in closed position. The runner 19 is of the ordinary construction employed, being slidably mounted upon the staff and to which the ribs are pivotally connected through the usual spreaders to open and close the umbrella. The position of the collar 12 materially strengthens the construction as the sleeve 16 extends far enough out from the handle to have the tongues 18 set in the longitudinal notches while the staff extends into the handle for a considerable distance, thereby giving a double thickness of metal where the handle joins the staff and for a considerable distance on either side thereof; the strain being the greatest at the point where the handle is connected to the staff.

From the foregoing description it will be readily seen that to attach the handle to the staff, the staff and the sleeve are telescoped until the tongues 18 set in the notches 14 in the collar whereupon the dog registers with the slot 17 and projects therefrom, when all the parts are firmly locked and any thrust upon the lower end of the staff while used as a cane or otherwise would throw the force of the blow on the collar 12 and sleeve 16, the interlocking parts of which are not easily injured.

I claim:

In an umbrella, the combination with a handle, of a sleeve secured therein, said sleeve having a longitudinal slot formed therein and a longitudinally projecting tongue on its free end, a longitudinally slotted tubular staff telescoping said sleeve, a spring-pressed dog in said staff adapted to engage the registering longitudinal slots of said staff and sleeve whereby to lock said parts against relative longitudinal movement, and a collar secured on said staff and provided with a longitudinal notch adapted for engagement with the projecting tongue of said sleeve whereby to lock said sleeve and staff against relative rotation, substantially as described.

JULIUS F. WITT.

Witnesses:
FREDERICK C. GOODWIN,
JAMES R. OFFIELD.